(12) United States Patent
Linnemann et al.

(10) Patent No.: US 8,043,661 B2
(45) Date of Patent: Oct. 25, 2011

(54) DECORATIVE LAMINATE AND CORRESPONDING PRODUCTION METHOD

(75) Inventors: Thomas C. Linnemann, Salzburg (AT); Gerald Hoeglinger, Schoerfling (AT)

(73) Assignee: Thomas C. Linnemann, Salzburg (AT)

( * ) Notice: Subject to any disclaimer, the term of this patent is extended or adjusted under 35 U.S.C. 154(b) by 1283 days.

(21) Appl. No.: 10/580,702

(22) PCT Filed: Nov. 26, 2004

(86) PCT No.: PCT/EP2004/013458
§ 371 (c)(1),
(2), (4) Date: Feb. 20, 2007

(87) PCT Pub. No.: WO2005/051637
PCT Pub. Date: Jun. 9, 2005

(65) Prior Publication Data
US 2007/0160816 A1    Jul. 12, 2007

(30) Foreign Application Priority Data
Nov. 26, 2003 (DE) .................................. 103 55 180

(51) Int. Cl.
*B05D 3/04* (2006.01)
(52) U.S. Cl. .......................... 427/334; 427/363; 427/416
(58) Field of Classification Search .................. 427/334, 427/363, 416
See application file for complete search history.

(56) References Cited

U.S. PATENT DOCUMENTS

| 2,341,078 | A | * | 2/1944 | Bradley, Jr. ................. 428/40.1 |
| 3,373,071 | A |   | 3/1968 | Fuerst |
| 3,798,711 | A |   | 3/1974 | Cousins |
| 4,250,282 | A | * | 2/1981 | Dorries et al. ................. 525/509 |
| 4,400,423 | A |   | 8/1983 | Scher et al. |
| 4,478,660 | A | * | 10/1984 | Landler et al. ................. 156/78 |
| 4,499,137 | A |   | 2/1985 | O'Dell et al. |
| 4,532,170 | A | * | 7/1985 | O'Dell et al. ................. 428/143 |
| 4,713,138 | A |   | 12/1987 | Ungar et al. |
| 4,741,946 | A |   | 5/1988 | Ungar et al. |
| 4,971,855 | A |   | 11/1990 | Lex et al. |
| 5,344,704 | A |   | 9/1994 | O'Dell et al. |
| 5,362,557 | A |   | 11/1994 | Albrinck et al. |
| 5,545,476 | A | * | 8/1996 | O'Dell et al. ................. 428/327 |

(Continued)

FOREIGN PATENT DOCUMENTS

AT    405 265 B    6/1999

(Continued)

OTHER PUBLICATIONS

Chemical Plus brochure on F-T wax.*

(Continued)

*Primary Examiner* — Bruce H Hess
*Assistant Examiner* — Tamra L Amakwe
(74) *Attorney, Agent, or Firm* — Osha • Liang LLP

(57) ABSTRACT

A method is described for producing a decorative laminate including: providing a decorative layer, applying a mixture of a thermohardening synthetic resin and hard particles to said layer, pressing the decorative layer and the mixture in a hot press at a press temperature in order to obtain a laminate, the mixture also containing a wax whose melting point is less than approximately 140° C. and/or by more than approximately 50° C. lower than the press temperature. A decorative laminate, a decorative laminate board and a method for producing a decorative prepreg sheet are also disclosed.

43 Claims, 3 Drawing Sheets

U.S. PATENT DOCUMENTS

| | | | |
|---|---|---|---|
| 6,090,871 A | 7/2000 | Reiners et al. | |
| 6,495,246 B1 | 12/2002 | Sakaguchi et al. | |
| 2001/0051748 A1 | 12/2001 | Heinrichs et al. | |
| 2003/0024637 A1* | 2/2003 | Min, III | 156/307.3 |
| 2003/0152753 A1 | 8/2003 | Waller, Jr. | |
| 2005/0186399 A1* | 8/2005 | Taylor | 428/195.1 |

FOREIGN PATENT DOCUMENTS

| | | |
|---|---|---|
| CH | 432 818 | 3/1967 |
| DE | 29 23 608 A1 | 5/1980 |
| DE | 3916099 A1 | 11/1990 |
| DE | 691 07 370 T2 | 6/1995 |
| DE | 44 07 643 A1 | 9/1995 |
| DE | 44 19 572 A1 | 11/1995 |
| DE | 694 15 970 T2 | 8/1999 |
| DE | 199 03 912 A1 | 8/2000 |
| DE | 199 03 914 A1 | 8/2000 |
| DE | 100 03 118 A1 | 8/2001 |
| EP | 0 130 072 B1 | 1/1985 |
| EP | 0 472 036 A1 | 2/1992 |
| EP | 0 563 834 A1 | 10/1993 |
| EP | 0 732 449 A1 | 1/1996 |
| EP | 0 993 944 A2 | 4/2000 |
| EP | 0 875 399 B1 | 10/2001 |
| GB | 1197726 | 7/1970 |

OTHER PUBLICATIONS

"DEUREX, Waxes + Additives", DEUREX Micro Technologies Gmbh, No. 505 E, Jul. 2002, pp. 1-3.

* cited by examiner

DECORATIVE LAMINATE AND CORRESPONDING PRODUCTION METHOD

BACKGROUND OF THE INVENTION

1. Field of the Invention

The present invention relates to a decorative laminate, a decorative laminate board as well as methods for producing the decorative laminate and decorative laminate board.

2. Brief Description of Related Art

Decorative laminates are being increasingly used in the field of floor coverings, work tops and table tops. Given the fields of application, properties such as abrasion resistance and wear resistance are of prime importance for the quality of such a decorative laminate and decorative laminate board. In addition, the properties that account for an optical impression of a patterned laminate or a surface of the decorative laminate, such as transparency and colour impression, are of particular relevance. Decorative laminate boards commonly comprise three main components: a protective layer (uppermost layer); a decorative layer having a pattern, which is covered by the protective layer; and a supporting substrate for supporting the protective layer and the decorative layer. Therefore, the properties of the protective layer or uppermost layer, respectively, are particularly relevant for an overall quality of the decorative laminate.

Conventionally, a so-called "overlay" is disposed on top of a decorative web, which overlay is a high-quality covering web or coating web made of paper which is impregnated with a resin and becomes transparent during the pressing process. As part of past efforts to improve an abrasion resistance of the decorative laminates and of the uppermost layer, in particular, hard particles, such as those made from silica, were incorporated into the uppermost layer. However, many manufacturers of decorative laminates encountered problems in achieving a homogeneous distribution of these particles in and on the coating web (overlay) and thus the uppermost layer.

This triggered a new trend of replacing covering webs with layers of synthetic resins comprising particles. To this effect, decorative laminates are conventionally manufactured by impregnating a paper web having a pattern thereon with a thermohardening resin and by either fully or partially hardening the impregnated paper web by application of pressure and heat, optionally together with a supporting web also impregnated with resin. Subsequently, the thus coated paper web is disposed on top of a supporting substrate, in case of a fully hardened decorative laminate by adhesive bonding or the like and in case of an only partially hardened decorative laminate by additional application of pressure and heat. Such decorative laminates tend to have a better transparency and thus convey a better optical impression of the pattern.

Continuous efforts are being made to improve properties of the protective layer, which are crucial for the properties of the entire decorative laminate, both with and without use of covering webs. As a result, many concepts for achieving protective layers of improved quality have been developed. These concepts mainly relate to the particles themselves, as well as the embedding of the particles in the synthetic resin. Use of hard particles in the production process created problems in that the tools used for application of pressure and heat, such as hot presses, were damaged by these new layers. This was attributed in particular to parts of the particles protruding and sticking out from a surface of the synthetic resin and resulted in increased wear of the tools.

Accordingly, efforts are made to improve embedding of the particles in the resin. Some approaches are based on an improvement of a distribution of the particles in the suspension used in the production process prior to its application, for instance by addition of α-cellulose, such as described in published patent application EP 0 732 449 A1.

Despite some success having already been achieved, there is still a need for decorative laminates and decorative laminate boards wherein embedding of the particles is improved. A fairly comprehensive review of the prior art may be found in European patent EP 0 875 399 B1, the content of which is incorporated by reference herein.

SUMMARY OF THE INVENTION

Therefore, it is an object of the present invention to provide decorative laminates and decorative laminate boards in which the particles are better embedded in the protective layer, or the suspension forming the basis for the protective layer, respectively, at least during a production process thereof, and which, as a result, comprise protective layers having better surface properties.

It is a further object of the present invention to provide a method of producing such decorative laminates and decorative laminate boards wherein less wear and damage of the tools occurs.

This object is achieved by a method for producing a decorative pre-impregnated (pre-preg) sheet and a method for producing a decorative laminate as well as a method for producing a decorative laminate board. In addition, the object is achieved by a decorative pre-preg sheet, a decorative laminate as well as a decorative laminate board. Exemplary embodiments are subject of the dependent claims.

According to a first exemplary embodiment of the present invention, a method for producing a decorative laminate is provided which comprises: providing a decorative layer, applying a mixture comprising a thermohardening synthetic resin and hard particles to the decorative layer and pressing the decorative layer and the mixture in a hot press at a press temperature, wherein the mixture further comprises at least one wax having a melting range below a temperature of about 140° C.

According to a second exemplary embodiment, the present invention provides a method for producing a decorative laminate, comprising: providing a decorative layer, applying a mixture comprising at least a thermohardening synthetic resin and hard particles to the decorative layer, and pressing the decorative layer and the mixture in a hot press at a press temperature to form a laminate, wherein the mixture further comprises at least one wax having a melting range of more than about 50° C. below the temperature of the press.

In a third exemplary embodiment, the present invention provides a method of producing a decorative laminate board, comprising: providing a decorative layer, applying a mixture comprising a thermohardening synthetic resin and hard particles to the decorative layer, arranging the decorative layer on a supporting substrate, and pressing the supporting substrate, decorative layer and the mixture in a hot press at a press temperature to form a decorative laminate board, wherein the mixture further comprises at least one wax having at least one of a melting range below a temperature of about 140° C. and a melting range of more than about 50° C. below the temperature of the press.

In a fourth exemplary embodiment, the present invention provides a decorative laminate comprising: a decorative layer and a protective layer fixedly attached to the decorative layer, wherein the protective layer comprises a mixture of at least one thermohardened synthetic resin, hard particles and at least one wax having a melting range below a temperature of about 140° C.

A decorative laminate according to the present invention may be obtained by the methods according to the present invention.

In a fifth exemplary embodiment, the present invention relates to a decorative laminate board comprising a supporting substrate, on which a decorative laminate according to the fourth exemplary embodiment of the present invention is disposed. The decorative laminate may be disposed directly on the supporting substrate, for instance. Alternatively, one or more interim layers may be interposed between the supporting substrate and the decorative layer.

In a sixth exemplary embodiment, the present invention provides a decorative pre-impregnated (pre-preg) sheet and a method of production thereof, wherein the method comprises applying a thermohardening synthetic resin, hard particles and a wax having a melting range below a temperature of about 140° C. to a decorative layer, and subsequent drying at a temperature above the melting range of the wax.

The inventors found that decorative laminates, and in particular protective layers of decorative laminates, having particularly advantageous properties may be obtained if a wax or mixture of waxes having the above indicated properties is used, and in particular is used in the methods according to the present invention. In particular, it was found that addition of a suitable wax or mixture of waxes to the mixture to be applied allows achieving better embedding of the hard particles in the protective layer. Addition of the wax or mixture of waxes, respectively, has a particularly advantageous effect on the wear of the tools during the production process. Without wishing to be bound by theory, the inventors believe that the added wax or mixture of waxes, respectively, melts completely during the production process, in particular during the hot pressing, and thus provides a lubricating effect for the particles, at least in the liquid mixture to be deposited. This effect is particularly pronounced with waxes having a low melting viscosity. This lubricating effect permits in particular hard particles having sharp edges to move past one another substantially without disturbance. Thus, it allows prevention of agglomerations of particles, which would impair a homogeneous distribution of particles both in the liquid as well as in the hardended mixture on the decorative layer. Moreover, it is believed that upon hot pressing, the wax tends to accumulate on a surface of the deposited mixture opposite a press face and thus somewhat at least partially displaces the hard particles from the surface, which will later be the wear surface, i.e. the surface which is used for wear and which is visible. Upon subsequent use of the decorative laminate, or by means of a special pretreatment, material is removed from the surface, and in particular wax is removed from particles located close to the surface such that a defined surface roughness is achieved.

During the production of the pre-preg sheet, the drying temperature is chosen such that the wax melts to provide this advantageous effect in the production of the decorative pre-preg sheet, and the decorative laminate, and the decorative laminate board, respectively.

It has also been found that a better embedding of the particles into the protective layer, in particular into the synthetic resin network of the protective layer, can be achieved and that a number of tips or other portions of particles protruding from the applied mixture during the production process can be significantly decreased.

In addition, it has surprisingly been found that due to this new kind of protective layer, the decorative laminates according to the present invention have a very advantageous, warm wood color as compared to conventional decorative laminates.

The protective layer of the decorative laminate according to the present invention is configured to complete the decorative laminate or decorative laminate board on a wear side thereof, i.e. the side which is intended to be viewed and used for wear. The press temperature is to be understood as the temperature at which the press face of a hot press is set for the pressing process.

The term "wax" as used herein is to be understood in the sense of its phenemological meaning and shall in accordance with Römpp, Chemical Encyclopaedia, Georg Thieme Verlag, 9th Edition (German version) designate "a range of natural or synthetically produced materials", "which usually have the following properties: kneadable at 20°, solid to brittle and hard, coarse to finely crystalline, transparent to opaque, but not glass-like, melting above 40° C. without decomposition". From a chemical viewpoint, waxes may be carbohydrates, alcohols or fatty acid esters, for instance.

Waxes are generally also characterized in that they typically have a well defined melting point and have a very low viscosity at temperatures just above this melting point. As will become apparent from the further description, waxes or mixtures of waxes suitable for use in the present invention may also have a broad melting range.

The term "melting range" refers to a melting range which is determined by means of differential scanning calorimetry DSC. Also, a sharply defined melting point shall in this context fall within the meaning of "melting range." In particular, the "melting range" as used herein shall define that range within which at least 80% of a melting energy determined by DSC is consumed, wherein each additional 10% of the necessary melting energy may be consumed at temperatures either above or below one of the upper and lower limits of the indicated melting range. An indication of the melting range in the context of this application, therefore, defines a range within which at least 80%, preferably 90% of a total melting energy required for the melting of the wax is consumed. Therefore, with a melting range of lower than 120° C., an additional 10% of the required melting energy could be provided at temperatures above 120° C.

The melting range of the at least one wax may be below a temperature of about 130° C., in particular below a temperature of about 120° C. In other embodiments, the melting range of the at least one wax is substantially in a range of about 80° C. to about 120° C., and in particular in a range of about 90° C. to about 115° C.

A wax or a mixture of waxes which has a melting viscosity of less than 75 mPa·s at the temperature of the press may be used, for instance less than 50 mPa·s or less than 30 mPa·s. In addition or alternatively, the at least one wax or the mixture of waxes, respectively, may have a melting viscosity of less than 100 mPa·s at 5° C. above the upper limit of its melting range, or less than 50 mPa·s, for instance, or even less than 30 mPa·s.

The at least one wax may have a density in a range of from 0.90 to 0.99 kg/l, in particular in a range of from 0.94 to 0.98 kg/l, and in particular about 0.96 kg/l.

The wax or mixture of waxes may be used in a micronised form. The wax or mixture of waxes used in the mixture to be applied may be provided as a raw material with 90% of the wax particles having a size of less than 30 micrometers and/or 50% of the wax particles having a size of less than 10 micrometers (these values are based on a particle size distribution determined by laser scattering according to Fraunhofer).

Generally, synthetic waxes may be used, and in particular polyalkylene waxes may be used.

In an exemplary embodiment of the method according to the present invention, a Fischer-Tropsch-Wax is used. Such a wax is usually a low molecular polyethylene from a carbon gasification process (synthesis gas procedure) wherein the molecular components are substantially present in straight chains. The melting range of such a wax is generally in a range of from about 80° C. to about 115° C., wherein the melting range may comprise the entire indicated range or just parts thereof, and wherein this range may vary according to a degree of fractionation. A density of such a wax is typically from about 0.94 to about 0.98 kg/l. Fischer-Tropsch waxes are generally hard and brittle and have a melting viscosity of less than 50 mPa·s, in particular from about 20 to about 30 mPa·s.

One suitable example of such a Fisher-Tropsch wax has a melting range of from 99° C. to 112° C. (determined by a Kofler hot bench), is additionally micronised and has a density of 0.96 kg/l and an acid number of less than 1 mg KOH/g. The melting viscosity of this one embodiment is 40 mPa·s at 125° C. and 30 mPa·s at 150° C. The molecular weight is between about 800 and 1000 a.u. Additionally, mixtures of waxes having a Fischer-Tropsch wax as a main component are suitable, in particular those mixtures wherein more than 80% of the mixture is comprised by a Fischer-Tropsch wax.

It has turned out to be favorable for the method and the quality of the resulting decorative laminate, in particular for the protective layer of the decorative laminate, if the at least one wax is present in the mixture to be applied to the decorative layer in an amount from 0.1 to 5 weight percent of the mixture, in particular in an amount from 0.2 to 3 weight percent, or from 0.5 to 3 weight percent of the mixture. Accordingly, the wax will be present in the protective layer of the produced decorative laminate in an amount of from 0.11 to 5.5 weight percent of the mixture forming the protective layer, wherein this value refers to a decorative laminate immediately after its production, i.e. before removal of an upper layer of wax.

Particles suitable for use with the present invention are those having a sufficient hardness, wherein hardness as used herein refers to a Mohs hardness. Particles are referred to as "hard" in the context of the present invention if they have a Mohs hardness of at least 5. Hard particles which have a Mohs hardness of 7 or more may be used, with 8 or more being even more suitable. Examples of materials suitable as hard particles are silica, silicon carbide, titanium dioxide as well as alumina, for instance. Corundum particles may be used as hard particles. Additionally, the size of the particles as well as the particle size distribution are particularly relevant, for instance for the ability of the particles to be dispersed in the synthetic resin solution and thus for a distribution across an area and within a space of the protective layer associated therewith. In addition, a shape of the particles, i.e. a presence of edges as well as a regularity of the surface and the like, may have an influence on the properties of the protective layer. This influence is decreased in an advantageous manner by the addition of wax to the mixture to be applied to the decorative layer according to the present invention and the resulting presence of wax in the protective layer. Apart from hardness, optical properties of the particles, such as the refractive index, are important in the choice of these particles, since embedding of particles into the protective layer should not impair its transparency. Therefore, it is advantageous to choose a refractive index of the particles which is similar to the refractive index of the synthetic resins or synthetic resin mixture, respectively. Of course, the hard particles should not be soluble in the mixture used for production of the protective layer.

In exemplary embodiments, at least 90% of the hard particles have a size of less than 80 micrometers, for instance between 10 and 50 micrometres, or from 60 to 80 micrometers. Those values are based on a particle size distribution determined by laser scattering according to Fraunhofer.

An amount of hard particles to be used in the mixture to be applied may be chosen such that the hard particles are present in the protective layer of the decorative laminate in an amount of from 5 to 65 weight percent, based on a total weight of the mixture of the protective layer, for instance 15 to 50 weight percent.

Values indicating weight percent relative to a total weight of the protective layer, for instance, refer to a total weight of the protective layer having a hypothetical remaining water content of about 2 weight percent of water.

In an example of the method for making a decorative laminate board according to the third exemplary embodiment of the invention, the decorative layer may be disposed on at least one supporting layer before being arranged on the supporting substrate, wherein the at least one supporting layer is arranged in between the supporting substrate and the decorative layer, and wherein the at least one supporting layer is pressed together with the supporting substrate, the decorative layer and the mixture. This at least one supporting layer is typically soaked or impregnated with a mixture having a synthetic resin as the basis, wherein the synthetic resin or synthetic resin mixture may correspond to the synthetic resin or synthetic resin mixture used in the mixture for application to the decorative layer. The supporting substrate may be a medium density fiber plate, a press board or a stack of core sheets (which are impregnated with the resin), and core papers in particular, which form a high pressure laminate upon pressing. In addition, a so-called counteracting layer may be deposited on that side of the supporting substrate which faces away from the decorative layer. Furthermore, the mixture may be applied to the decorative layer, optionally be pre-dried or pre-hardened and then the decorative layer be disposed on the supporting substrate together with the mixture. Alternatively, the decorative layer may be disposed on the supporting substrate before the mixture is applied thereto.

Applying the mixture to the decorative layer may comprise fully soaking the decorative layer, i.e. applying the mixture to both sides of the decorative layer, or applying the mixture to just one side of the layer. In those embodiments where the decorative layer comprises a decorative web and a covering web, the mixture may be applied to only one side of the covering web, or to both sides of the covering web, or to both the covering web and that side of the decorative web facing the covering web. If a covering web is used in the decorative layer, the mixture including hard particles is applied to at least that side which will later form the side exposed to wear and remains visible.

The melting range of the at least one wax, which in case of using several different waxes means the melting range of the entire mixture of waxes or each of the used waxes, respectively, in the mixture to be applied to the decorative layer may be more than 60° C., and in particular more than 70° C. below the temperature of the press.

The press temperature may be set to about a hardening temperature suitable for hardening the at least one synthetic resin. In particular, the press temperature may be set to a temperature which is suitable for fast hardening of the at least one synthetic resin. A dwell time of the decorative layer having the applied mixture thereon that is to be pressed is typically in a range of several seconds, for instance about 8 to 20 seconds. However, it may also extend up to several minutes. A dwell time of about 4 to 10 seconds, and in particular of about 5 to 8 seconds is suitable. In order to achieve fast hardening of the synthetic resin, the press temperature may be set to be higher than a minimum temperature required for the hardening process, for instance by about 50° C. higher. The person skilled in the art will choose the setting of the hot press, such as press temperature, press pressure as well as dwell time, for a given composition of the mixture such that the wax will practically fully melt whilst the dwell time in the hot press is still sufficiently short for the synthetic resin not to stick to the press face.

In exemplary embodiments of the present method, the press temperature is in a range between about 180° C. and about 240° C., for instance between about 200° C. and 225° C., and by way of example at more than 210° C. This is advantageous when a synthetic resin is used whose hardening typically requires temperatures of more than about 170° C., such as a melamine resin. The temperature used for hardening of the synthetic resin will for the same resin vary with the kinds and amounts of additives used with the resin, in particular the added hardener. The press pressure may be in a range between 20 and 45 bars, in particular between 30 to 40 bars, for instance.

The decorative layer usually has a pattern, such as a wood pattern or a color pattern.

Providing the decorative layer may comprise providing a decorative web. In a simple scenario, the decorative layer merely comprises an untreated decorative web which is usually provided with a pattern. The decorative web may then be pretreated. For instance, it may be impregnated with a base layer or the like. The decorative layer may have a variety of thicknesses and degrees of stiffness and may encompass anything from thin paper webs which may be rolled up to boards suitable as supporting substrates. It is known from the prior art to use a press board panel, for instance, in order to save cost by omission of a printed web.

Such a decorative web may be a paper web, cellulosic web or polymer web, for instance. However, a variety of suitable other materials are known from the prior art. A basis weight of the decorative web and an amount and viscosity of the mixture to be applied thereto are typically set in dependence of one another and in dependence of a desired final basis weight of the decorative laminate. Typically, basis weights of paper in a range of from about 50 to about 130 g/m² are used. A porosity of the paper is a further relevant parameter for the choice of paper.

In exemplary embodiments, providing the decorative layer comprises providing a decorative web and a covering sheet. For instance, overlay papers which have a basis weight of about 20 to about 50 g/m² may be used as the covering sheets ("overlays"). The covering sheets, which are impregnated with at least one of the mixture and coating composition during the production process, become transparent upon pressing. In the context of the present invention, the covering sheet is treated as part of the decorative layer for sake of simplicity. This treatment, however, is purely formal and does not relate to functionality, since the covering sheet could also be a part or a basis of the protective layer.

In further exemplary embodiments of the method according to the present invention, the mixture is applied to the decorative web without any interim step involving an additional coating or any other treatment. This decorative web may be provided as a pre-treated or unpre-treated decorative web. A treatment could comprise a layer for control of a porosity of the decorative web, for instance, which prevents hard particles from penetrating into the pores. Alternatively, the mixture may be applied to a covering sheet arranged on top of a decorative web, which may optionally be already impregnated. Those embodiments provide an economic process.

In other exemplary embodiments of the method according to the present invention, providing the decorative layer additionally comprises applying a coating composition to the decorative web in addition to providing the decorative web itself. In this exemplary embodiment, the application of the mixture comprising the hard particles to the decorative layer may take place immediately after the application of the coating composition to the decorative web. This would correspond to a so-called wet-in-wet procedure. This can, for instance, be accomplished by applying a coating composition to a decorative web made from a paper web, for instance by soaking the decorative web in a coating composition in an impregnating bath, subsequent removal of excess coating composition, if necessary, and immediately thereafter, applying the mixture comprising at least particles and wax on the basis of synthetic resins to the decorative web coated with the coating composition, i.e. the decorative layer. The decorative layer and mixture are then pressed by application of heat to form a laminate, typically after a drying step before the pressing.

In alternative embodiments, the decorative web impregnated with the coating composition may also be pre-dried before application of the mixture to the decorative layer, which comprises the decorative web and dried coating composition.

In other exemplary embodiments, a coating composition may be applied to the decorative web and the covering web in a similar manner, and the mixture comprising the hard particles may be subsequently applied to the covering web which is disposed on top of the decorative web.

In further exemplary embodiments, the coating composition comprises the at least one synthetic resin but no hard particles. For instance, the coating composition may substantially correspond to the composition of the mixture to be applied to the decorative layer, but be free from hard particles. Those embodiments in which a coating composition is applied to the decorative web or the covering web first enable a good attachment between the decorative layer and the protective layer. There is practically no boundary visible between these two layers. Furthermore, those exemplary embodiments allow preventing particles from being present on the decorative web or the covering web. This, on the one hand, saves particles and thus cost, and on the other hand conveys a better optical impression of the pattern.

Accordingly, in exemplary embodiments of the decorative laminate according to the present invention, the decorative layer comprises a decorative web and/or a covering sheet which is/are fixedly attached to or provided with a coating. This coating may be free from hard particles. In analogy to the embodiments described above in connection with the methods according to the present invention, a composition of the coating of the decorative web and/or the covering web substantially corresponds to a composition of the protective layer on top of the decorative layer without hard particles.

The pressing of the decorative layers with the mixture applied thereto can be set such that the resulting decorative laminates are either practically fully or only partially hardened. Partially hardened decorative laminates can be disposed on a supporting substrate in an extra step, optionally in the presence of additional interlaid supporting layers, and then pressed together. Alternatively, the decorative laminate may be full hardened and subsequently deposited on a supporting substrate, optionally with supporting layers sandwiched in-between. In further exemplary embodiments, the decorative layer with the mixture applied thereto is disposed on one or more supporting webs and/or a supporting substrate before pressing.

The mixture to be applied to the decorative layer may further comprise additives. Such additives are common and well known in this field of application, and comprise substances such as at least one of surface active agents, hardeners, modifying agents, catalysts, accelerators, and separating agents. An example of an accelerator used is vinylpyrrolidone, preferably 1-vinylpyrrolidone-homopolymers. Addition of one or more silanes is also suitable. The term "silane" as used herein stands for alkoxysilane, in particular ethylenediamine alkoxysilane for improved adhesion. Which additives and in which amount these are used will be dependent on the composition of the mixture and the properties of the solvent or dispersant, respectively, of the synthetic resin and other parameters, which will be known to the person skilled in the art. These additives may be consumed or changed or may evaporate during the pressing and the hardening process, in particular. As a result, they may be present in the same or a changed form in the final decorative laminate or the protective layer respectively. In addition, it is also conceivable to add pigments to the mixture.

The present invention has proven to be particularly advantageous if the thermohardening synthetic resin is a melamine resin or a melamine resin mixture. The synthetic resin may be provided as an aqueous suspension in the mixture to be applied to the decorative layer. Apart from melamine resins (melamine-formaldehyde-resins), other aminoplasts, such are urea-formaldhyde-resin may be used. In addition, the synthetic resins used, in particular the melamine resins, may also be modified with other resins, such as acrylic resins, polyester resins and the like. Further examples of suitable synthetic resins are known from the prior art. At least a portion of the synthetic resin may, for instance, be provided in the form of pre-hardened particles. It is further not excluded that in some embodiments, synthetic resins which are not or not fully thermohardening are used.

The mixture to be applied will usually be provided in liquid form, in particular as a suspension. Water is a suitable solvent or dispersant, respectively.

Applying the liquid mixture to the decorative layer may be accomplished in different ways. The mixture may be applied to the decorative layer by means of a kiss roll. In this embodiment, a kiss roll is partially immersed into an impregnating bath containing the mixture, takes up an amount of the mixture and transfers the mixture onto one side of the decorative layer which is guided over another part of the kiss roll. Alternatively, the mixture may also be applied by means of a wiper made from wire. A thickness of the wires typically used in such wipers in the method of the present invention is between about 0.8 mm and 2 mm. Wipers made from wire have the advantage that an amount of the mixture to be applied may be very well controlled by a suitable choice of parameters, such as a number of rotations per minute and a number of wires used. In addition, another option is to fully immerse the decorative layer in an impregnating bath containing the mixture to be applied. The choice which of the mentioned options is used will depend on an amount of the mixture to be applied, a viscosity thereof, optional drying and other coating steps, and other factors.

The mixture may be applied to the decorative layer in an amount of about 180 to 210 weight %, for instance, based on the weight of the decorative layer constituting 100%. In exemplary embodiments, the protective layers according to the present invention have a thickness in a range of from about 0.02 mm to 0.15 mm.

Before the pressing, one or more drying steps may be carried out. In those embodiments, the mixture comprising the thermohardening synthetic resin and the hard particles and optionally wax as well as further additives is first applied to the decorative layer. However, the wax may also be applied separately, for instance in a finely dispersed, solid form. Then, the decorative layer having the mixture thereon is dried in a convection dryer for about 1 to about 3 minutes, wherein a drying temperature profile is used which initially has an increasing drying temperature and towards the end a decreasing drying temperature. The drying temperature may be set to be high enough to make the wax melt, for instance it may be set to about 140° C. to 190° C. After the drying, the coated decorative layer may be cut into sheets as a decorative prepreg, may be stacked and stored in a dry and an air-conditioned environment until further processing. In these prepreg sheets, the wax is accumulated on the surface such that it may provide a protective effect in a subsequent pressing process.

The decorative laminates or decorative laminate boards, respectively, according to the present invention are suitable for a variety of applications, for instance as a floor covering, table tops, work tops, wall panels and the like.

In exemplary embodiments of the decorative laminate board according to the present invention, at least one side of the decorative laminate board has a tongue and groove profile.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
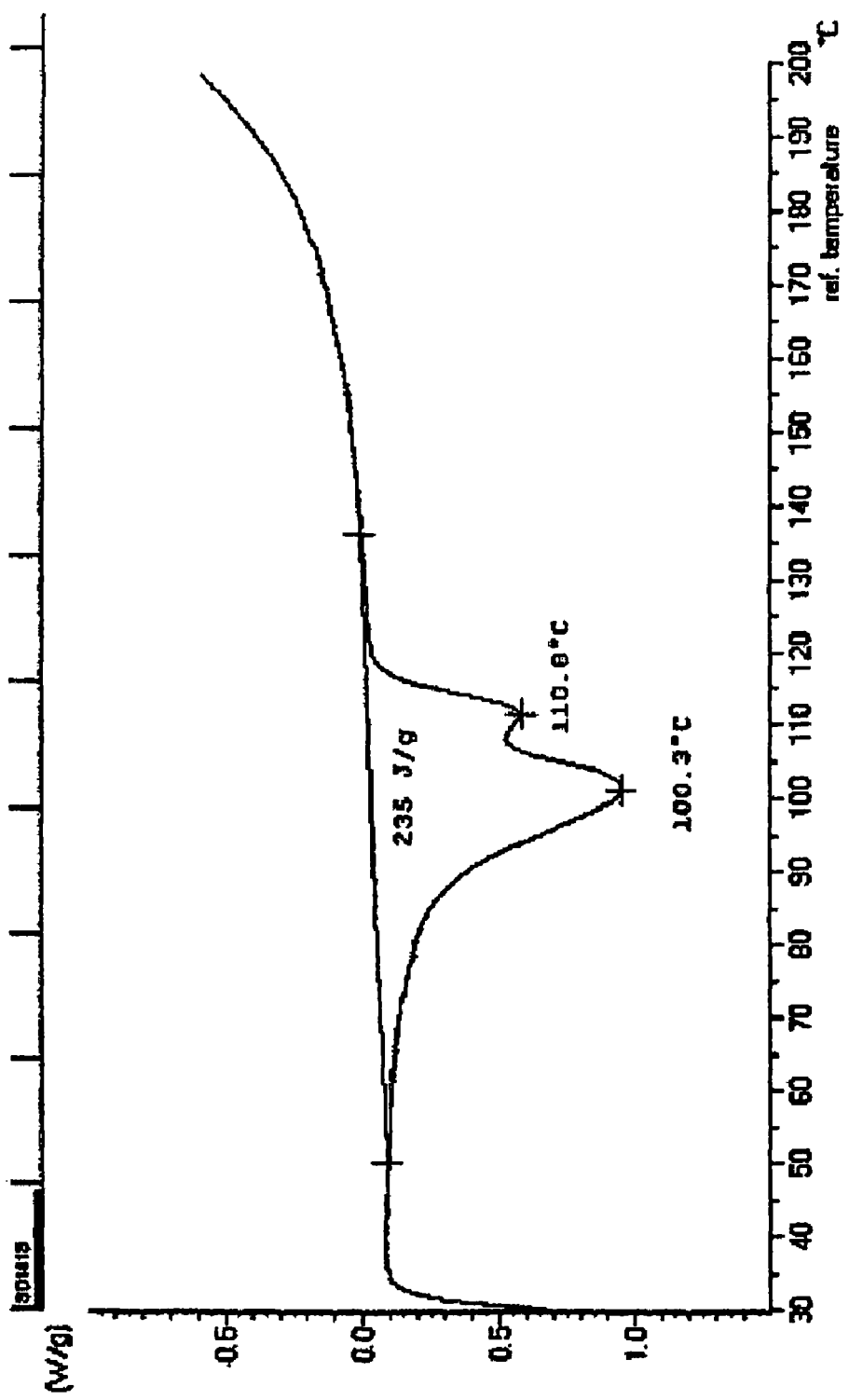
FIG. 1 shows a melting curve determined by DSC of a Fischer-Tropsch-wax suitable for use in the present invention.

In the exemplary embodiments which will be described in the following a Fischer-Tropsch-wax is used in the mixture to be applied. The Fischer-Tropsch-wax will be referred to as FT wax in the following. The melting diagram of the used FT wax determined by DSC is shown in FIG. 1. The diagram was gained by use of an FP 85 DCS measuring cell of a Metlar FP 900 thermosystem. For analysis of the FT wax, the following temperature program was used:

Step 1: heating from 30 to 200° C. at a heating rate of 5° C. per minute.

Step 2: cooling from 200 to 30° C. at a cooling rate of 20° C. per minute.

Step 3: heating from 30 to 200° C. at a heating rate of 5° C. per minute.

The melting diagram depicted in FIG. 1 was taken during step 3. The indicated temperature corresponds to the set temperature and therefore does not necessarily exactly correspond to the temperature of the sample examined by means of DSC.

As evident from FIG. 1, the melting range is substantially between 80° C. and 115° C., wherein a maximum is located at about 100° C. and an additional maximum is located at about 107° C.

Other than by its melting curve, the used FT wax is characterized by the following parameters: 50% of the wax particles are smaller than 9 micrometers, 90% of the particles are smaller than 22 micrometers. The density of the wax is 0.96 g/cm$^2$ and the acid number is smaller than 1 mg potassium hydroxide per gram. The melting viscosity of this wax is 40 mPa·s at 125° C., and 30 mPa·s at 150° C. These melting viscosities were determined by means of an ICI viscosity meter.

In the exemplary embodiment of the method according to the present invention, a mixture of the following composition was used:

TABLE 1

|  | Wt. % | Amount [kg] |
|---|---|---|
| Melamine resin dispersion, ca. 60% | 54.40 | 176.80 |
| Separating agent (ALTON 856, WIZ Chemicals, IT) | 0.03 | 0.10 |
| Surface active agent ALTON 883, WIZ Chemicals, IT) | 0.25 | 0.81 |
| Hardener (ALTON HM 720, WIZ Chemicals, IT) | 0.15 | 0.49 |
| Water | 3.87 | 12.58 |
| Accelerator (Luvicross, BASF, DE) | 2.60 | 8.45 |
| Silane (Dow Corning Z6020) | 0.80 | 2.60 |
| FT-Wax | 0.60 | 1.95 |
| Corundunm | 37.00 | 120.25 |
| Acetic acid, conc. | 0.30 | 0.98 |
|  | 100.00 | 325.00 |

A mixture for application to the decorative layer is made from the components mentioned in table 1 by intensive mixing. The melamine resin dispersion used is a conventional, commercially available dispersion having a solids content of about 60% solids (resin). A micronized 1-vinylpyrrolidone-homopolymer is used as the accelerator (modifying agent). The used corundum particles have a size in a range of from 10 to 90 micrometers, in particular 60 to 80 micrometers, or 10 to 50 micrometers. In addition, a thickening solution based on carob seed grain may be added. The FT wax is commercially available from the company Pointner and Rothschädl, Salzburg, Austria, under the product name Poro 100.

Figure 2:
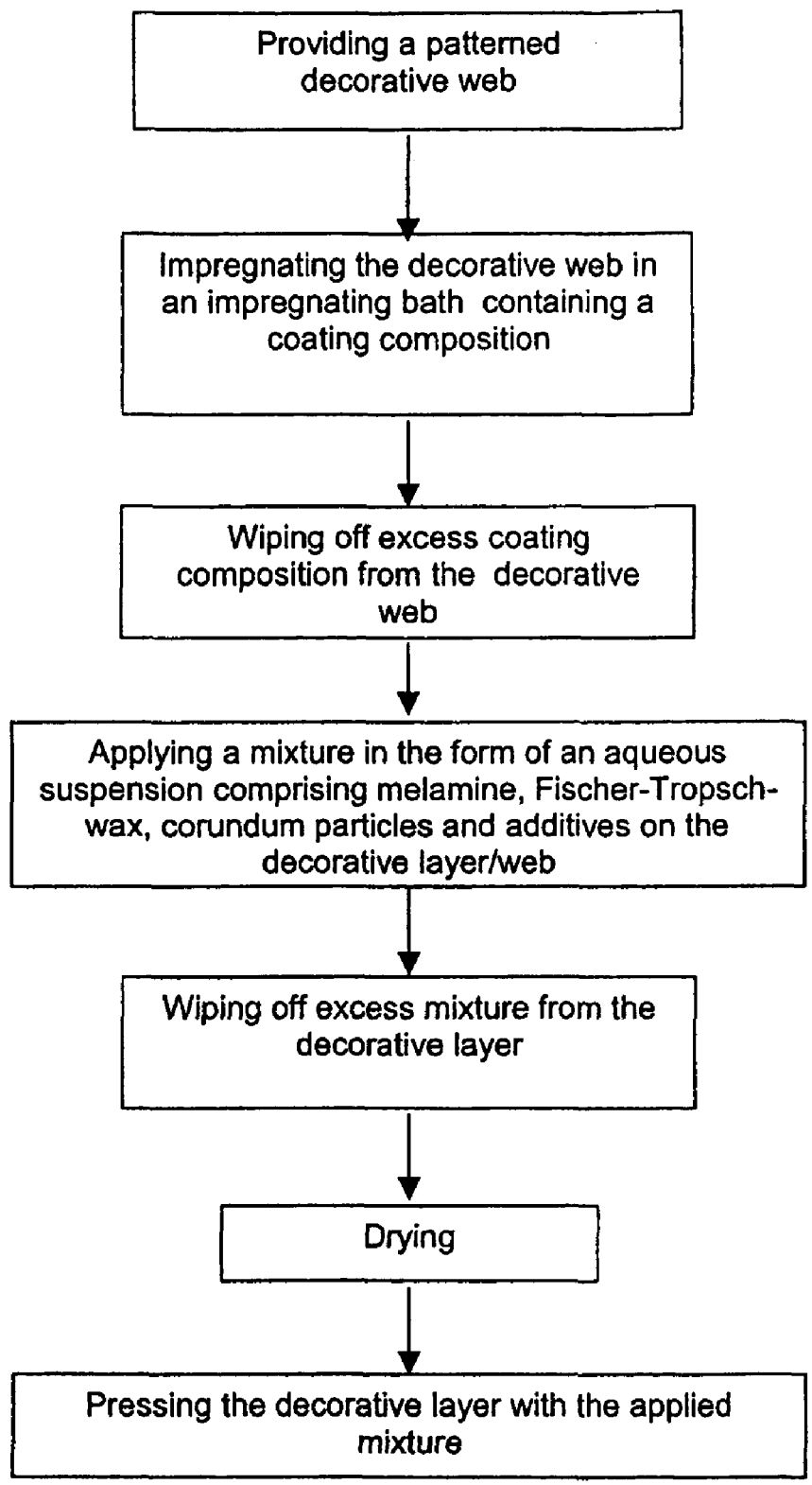
FIG. 2 shows a flow diagram schematically illustrating an exemplary embodiment of the method according to the present invention.
Figure 3:
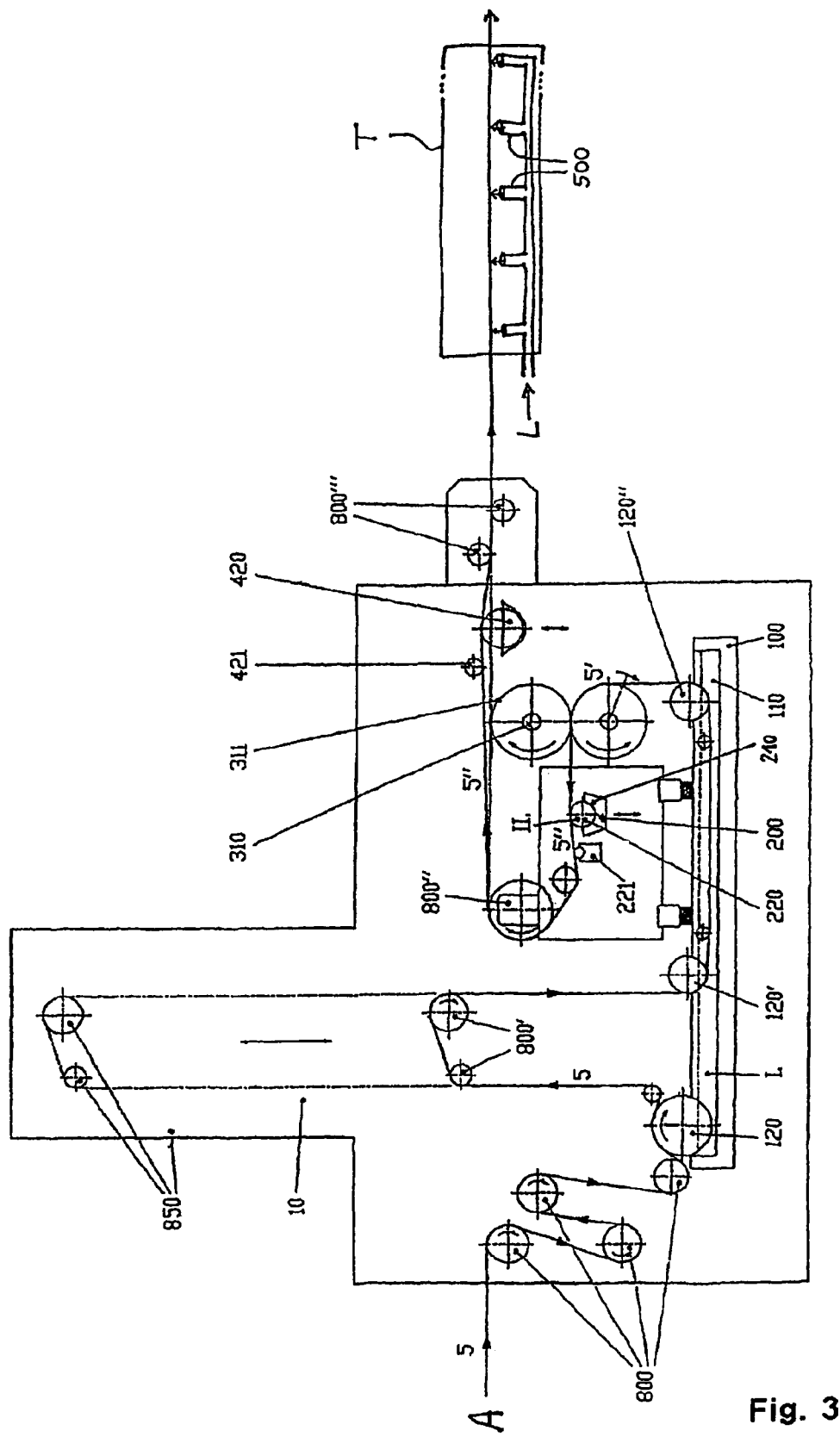
FIG. 3 shows an example of a coating apparatus suitable for use with the present invention.

A schematic illustration of the described exemplary embodiment of the method according to the present invention is shown in FIG. 2.

For providing a decorative web having a pattern printed thereon, a decorative web having a wood pattern printed thereon is transferred from a reel to a processing station, typically via plural rolls. In the present embodiment, a paper web having a basis weight of 80 g/m$^2$ is used as the decorative web.

In the processing station, the decorative web is first impregnated with a coating composition by means of a kiss roll. In this exemplary embodiment, the coating composition has the same composition as the mixture (see table 1), but is substantially free from hard particles. In a further step, excessive coating composition is removed from the decorative web by wiping. The decorative web and the coating composition together form the decorative layer.

In a further step, the mixture indicated in Table 1 is applied to the decorative layer as an aqueous suspension, for instance by means of a wiper made from wires. In the present exemplary embodiment, the amount added is about 200 weight %, based on the weight of the decorative layer. Then, excessive mixture is wiped off the decorative layer.

After application of the mixture to the decorative layer, a drying step takes place, such as in a convection drying tunnel and at increasing temperatures between 140 to 190° C. In the depicted embodiment, a 60 m long dryer is used, wherein the transfer speed is between 20 m per minute and 60 m per minute, depending on the kind of paper used. The material to be dried is both carried and heated by hot air exiting from air inlet nozzles. During the drying, the finely dispersed wax starts to melt and accumulate on the surface of the coating. The cut decorative prepreg sheets are then wrapped in foil, stacked and stored in an air-conditioned environment. The ability of the sheets to be stacked is improved by a separating or antiblocking agent, which may be added before drying or may be sprayed onto the sheets after drying. For further processing, the decorative prepreg sheets are separately pressed in a low pressure press to form a decorative laminate, wherein the press temperature is from about 200 to 225° C., and the press pressure is about 40 bars. The dwell time in the press is from about 5 to about 10 seconds.

An example of a coating station for use with the exemplary embodiment described above is described in the following:

From a reel (not depicted), the decorative paper web 5 which is to be impregnated and to be coated is transferred by an unwinder A over several guide rollers 800 to the impregnating and coating station 10. It then reaches a larger first kiss roll 120, a lower side of which is immersed in the impregnating bath 100 which is continually supplied with impregnating mixture 110. Kiss roll 120 takes up a layer of the impregnating mixture upon rotation, and transfers this onto a lower side of the paper web 5 such that a first wetting thereof takes place. For the purpose of conditioning, the web is then transferred over rolls 800' under application of a slight pulling force. Then, the web will be fully immersed via the first bath roll 120' in the resin mixture 110 in the bath 100, will remain immersed in the resin bath over a certain distance, which corresponds to an impregnating time of from 2 to 8 seconds, and is then guided as an impregnated, wet web by roll 120" out of the bath 110. After passing a pair of dosing rolls 310 with wiper 311 it is guided over kiss roll 220. This kiss roll 220 dips into the resin material 210 which comprises the abrasive particles and the finely dispersed wax in the bath 200. During transfer over roll 220, a wear side of the web is coated with the wear-resistant resin compound 210. The wiper 221 made from wires serves to distribute the compound evenly across the entire width of the web. The decorative web 5", which is now also provided with the wear coating, leaves the station via idle roll 800", a wiper made from wires 421, as well as a wiping roll with wiper 420, which is adjustable in height, and rolls 800'''. It is then transferred into the dryer T and is dried to a desired remaining water content. The dryer T itself is supplied with hot air L exiting from nozzles 500 in the dryer and carries the web thereby.

While the invention has been described also with respect to certain specific embodiments thereof, it is evident that many alternatives, modifications and variations will be apparent to those skilled in the art. Accordingly, the preferred embodiments of the invention set forth herein are intended to be illustrative and not limiting in any way. Various changes may be made without departing from the spirit and scope of the present invention as defined in the following claims.

What is claimed is:

1. A method for producing a decorative laminate, comprising:

providing a decorative layer, applying a mixture comprising a thermohardening synthetic resin and hard particles to the decorative layer, applying at least one wax to the decorative layer or to the mixture, pressing a supporting substrate, the decorative layer, the mixture and the wax in a hot press at a press temperature to form a decorative laminate board, wherein a melting range of the at least one wax is at least one of below a temperature of about 140° C. and by more than 50° C. below the press temperature, and drying the applied mixture at a drying temperature above the melting range of the wax.

2. The method according to claim 1, wherein the melting range is by more than 60° C. lower than the press temperature.

3. The method according to claim 1, wherein a dwell time in the press is from about 4 to 60 seconds.

4. The method according to claim 1, wherein a pressure of the press is less than 50 bars.

5. The method according to claim 1, wherein the press temperature is at least equal to or higher than a hardening temperature suitable for hardening the at least one synthetic resin.

6. The method according to claim 1, wherein the at least one wax has a melting viscosity of less than 75 mPa·s at the press temperature.

7. The method according to claim 1, further comprising drying the decorative layer with the applied mixture before the pressing, and at a drying temperature within a drying temperature range below the press temperature.

8. The method according to claim 7, wherein the drying is carried out until a remaining water content is 7% or less.

9. The method according to claim 7, wherein the drying temperature range is about 140° C. to 190° C.

10. The method according to claim 7, wherein during the drying, the drying temperature initially has an increasing temperature profile and thereafter a decreasing temperature profile.

11. The method according to claim 7, wherein a drying time is from 1 to 3 minutes.

12. The method according to claim 1, wherein the application of the wax is carried out together with the application of the mixture.

13. The method according to claim 12, wherein the wax is a component of the mixture.

14. The method according to claim 1, wherein the melting range of the wax is above 60° C.

15. The method according to claim 1, wherein at least 90% of the hard particles have a size below 80 μm.

16. The method according to claim 1, wherein the thermohardening synthetic resin is a melamine resin.

17. The method according to claim 1, wherein the hard particles are aluminium oxide particles.

18. The method according to claim 1, wherein the wax is a Fischer-Tropsch-Wax.

19. The method according to claim 1, wherein the at least one wax is comprised in the mixture in an amount of from 0.1 to 5 weight percent of the mixture.

20. The method of claim 1, further comprising arranging the decorative layer on a supporting substrate.

21. The method of claim 7, wherein the drying is carried out until a remaining water content is 6% or less.

22. A method for producing a decorative laminate, comprising:

providing a decorative layer, applying a mixture comprising a thermohardening synthetic resin and hard particles to the decorative layer, applying at least one wax to the decorative layer or to the mixture, drying the decorative layer with the applied mixture before the pressing, and at a drying temperature within a drying temperature range below the press temperature, wherein a drying time is from 1 to 3 minutes; and pressing a supporting substrate, the decorative layer, the mixture and the wax in a hot press at a press temperature to form a decorative laminate board, wherein a melting range of the at least one wax is at least one of below a temperature of about 140° C. and by more than 50° C. below the press temperature.

23. The method according to claim 22, wherein the melting range is by more than 60° C. lower than the press temperature.

24. The method according to claim 22, wherein a dwell time in the press is from about 4 to 60 seconds.

25. The method according to claim 22, wherein a pressure of the press is less than 50 bars.

26. The method according to claim 22, wherein the press temperature is at least equal to or higher than a hardening temperature suitable for hardening the at least one synthetic resin.

27. The method according to claim 22, wherein the at least one wax has a melting viscosity of less than 75 mPa·s at the press temperature.

28. The method according to claim 22, further comprising drying the decorative layer with the applied mixture before the pressing, and at a drying temperature within a drying temperature range below the press temperature.

29. The method according to claim 28, wherein the drying is carried out until a remaining water content is 7% or less.

30. The method according to claim 28, wherein the melting range of the wax is below the drying temperature.

31. The method according to claim 28, wherein the drying temperature range is about 140° C. to 190° C.

32. The method according to claim 28, wherein during the drying, the drying temperature initially has an increasing temperature profile and thereafter a decreasing temperature profile.

33. The method according to claim 22, wherein the application of the wax is carried out together with the application of the mixture.

34. The method according to claim 33, wherein the wax is a component of the mixture.

35. The method according to claim 22, wherein the melting range of the wax is above 60° C.

36. The method according to claim 22, wherein at least 90% of the hard particles have a size below 80 μm.

37. The method according to claim 22, wherein the thermohardening synthetic resin is a melamine resin.

38. The method according to claim 22, wherein the hard particles are aluminium oxide particles.

39. The method according to claim 22, wherein the wax is a Fischer-Tropsch-Wax.

40. The method according to claim 22, wherein the at least one wax is comprised in the mixture in an amount of from 0.1 to 5 weight percent of the mixture.

41. The method of claim 22, further comprising arranging the decorative layer on a supporting substrate.

42. The method of claim 22, further comprising drying the applied mixture at a drying temperature above the melting range of the wax.

43. The method according to claim 28, wherein the drying is carried out until a remaining water content is 6% or less.

* * * * *